United States Patent
Han et al.

(10) Patent No.: US 7,570,249 B2
(45) Date of Patent: Aug. 4, 2009

(54) RESPONDING TO CHANGE OF STATE OF CONTROL ON DEVICE DISPOSED ON AN INTERACTIVE DISPLAY SURFACE

(75) Inventors: Allen Ming-kuang Han, Kirkland, WA (US); Christina Summer Chen, Redmond, WA (US); Dana Lu Silverstein, Duvall, WA (US); Dawson Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 11/094,077

(22) Filed: Mar. 30, 2005

(65) Prior Publication Data

US 2006/0227099 A1    Oct. 12, 2006

(51) Int. Cl.
*G09G 5/00*    (2006.01)
(52) U.S. Cl. .................... 345/166; 345/157; 178/18.01; 178/18.09; 178/19.01; 178/19.05
(58) Field of Classification Search ......... 345/168–172, 345/182, 184, 156, 157, 163, 166; 178/18.01, 178/18.05, 19.01, 19.05
See application file for complete search history.

(56) References Cited

U.S. PATENT DOCUMENTS

| | | | |
|---|---|---|---|
| 4,992,650 A | 2/1991 | Somerville | 235/462 |
| 2001/0012001 A1* | 8/2001 | Rekimoto et al. | 345/173 |
| 2002/0021291 A1* | 2/2002 | Cook | 345/183 |
| 2003/0179323 A1* | 9/2003 | Abileah et al. | 349/24 |
| 2003/0235452 A1* | 12/2003 | Kraus et al. | 400/472 |
| 2005/0146513 A1* | 7/2005 | Hill et al. | 345/173 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

(Continued)

*Primary Examiner*—Amr Awad
*Assistant Examiner*—Jeff Pelligrino
(74) *Attorney, Agent, or Firm*—Workman Nydegger (57) ABSTRACT

A user input device includes one or more user controls that enable a user to selectively imports bits of data by activating the control when the user input devices proximate to a display surface of an interactive display system. By depressing or otherwise activating a user control, the user causes an element within the user input device to move through a plane of change so that the state of a parameter sensed by the interactive display system changes and is detected. In the examples provided, the parameter relates to infrared light that is reflected or absorbed or produced by a component of the user input device and is thus detected by an infrared sensitive camera. The input can be a single bit, or comprise a plurality of bits corresponding to a specific pattern.

8 Claims, 9 Drawing Sheets

OTHER PUBLICATIONS

Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Magerkurth, Stenzel, and Prante. "Stars—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavaári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. " i-LAND: An interactive Landscape for Creativity and Innovation." *Proceedings of the ACM Conference on Human Factors in Computing Systems (CHI'99)*, Pittsburgh, Pennsylvania, May 15-20, 1999, ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDesk: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, 201 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001, 30pp.

"Virtualboard." Available http://visilab.unime.it/visilab/virtualboard.htm. Printed Dec.16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Northrop Grumman "TouchTable™" Brochure © 2005 Northrop Grumman Space & Mission Systems Corp. RS1190705. 2pp.

* cited by examiner

RESPONDING TO CHANGE OF STATE OF CONTROL ON DEVICE DISPOSED ON AN INTERACTIVE DISPLAY SURFACE

FIELD OF THE INVENTION

The present invention generally relates to an input device that includes a user-activatable control to provide an input, and more specifically, to an input device that is used in proximity to an interactive display system and which includes a user-movable member that is moved to cause an input to which a sensor in the interactive display system responds.

BACKGROUND OF THE INVENTION

On most computing devices, the user provides inputs with a keyboard and with a conventional pointing device, such as a mouse, trackball, scratchpad, or other pointing button. Such input devices are much less intuitive than touch screens that enable a user to touch a spot on a displayed image and provide an input related to the object or move the virtual object that is being touched, to different positions on the display. However, touch screens are somewhat limited in the scope of user input and interaction that they can provide. For example, most touch screens are only able to detect a single point that is being touched on the screen at a time and are only responsive to a touch on the screen, which precludes more complex input and interaction with the computing device.

A further evolution of techniques to facilitate human-machine interaction exploits computer vision technology. For example, the MIT Media Lab, as reported by Brygg Ullmer and Hiroshi Ishii in "The metaDESK: Models and Prototypes for Tangible User Interfaces," *Proceedings of UIST October 1997:14-17,*" has developed another form of "keyboardless" machine interface. The metaDESK includes a generally planar graphical surface that not only displays computing system output, but also receives user input by recognizing pattern-encoded objects placed against the graphical surface. The graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of the objects placed on the graphical surface.

Similarly, papers published by Jun Rekimoto of the Sony Computer Science Laboratory, Inc., and associates describe a "HoloWall" and a "HoloTable" that use IR light to detect objects. It should be noted that the papers describing the "HoloWall" and "HoloTable" generally are silent regarding the details and process used for detecting objects based upon the IR light reflected from the object.

Examples of other methods and systems for detecting and responding to objects placed on or near a graphical surface are used in inventions owned by the assignee of the present application. These inventions are described, for example, in co-pending U.S. patent applications, including Ser. No. 10/813,855, entitled "Template Matching On Interactive Surface;" Ser. No. 10/814,577, entitled "Identification Of Object On Interactive Display Surface By Identifying Coded Pattern;" and application Ser. No. 10/814,761 entitled "Determining Connectedness And Offset Of 3D Objects Relative To An Interactive Surface," all of which were filed on Mar. 31, 2004.

Although inventions such as the metaDESK and the other inventions previously listed respond to objects on the graphical display surface, it is significant that the metaDESK's response is to the contemporaneous placement and movement of the objects. There is no indication in the published literature that the metaDESK can enable a user to input one or more bits by depressing a movable portion of an object. Clearly, it would be desirable to provide such a capability, to enable applications to respond to input not only from an object being placed on and/or moved about on a graphical display surface, but also as a result of a user interacting with the object. The user should be able to interact with the user input device to change a state of one or more bits related to the object for input to an application running on an interactive display surface.

Using the human-machine interfaces described above, moving one's hands or other physical objects on or near to the graphical display surface may replace keyboards, pointing devices, and other more conventional input devices. But, instead of only responding to a static condition in which an object is always recognized in the same manner, it would be more interesting and offer greater functionality if users are able to change the recognition of an object or a condition associated with the object based upon the user's interaction with the object. The altered condition of the object resulting from the user's interaction with it should be detected using the same approach employed for sensing the object on the surface.

SUMMARY OF THE INVENTION

The present invention provides a more versatile approach for input of one or more bits of data in response to a user activating a control on a user input device placed on an interactive display surface of an interactive display system. A housing of the user input device is thus adapted to be placed in proximity to the interactive display surface, e.g., rested on the display surface. A user-movable member or control element is disposed within the housing and is movable between a first position and a second position to provide an input to the interactive display system. The movement of the user-movable member between the first position and the second position enables a parameter to be sensed by an interactive display system to provide an input for an application or to the operating system.

In one embodiment, the movement of the user-movable member from the first position to the second position changes a reflectance value sensed by the interactive display system from a first state to a second state. In one embodiment, the user-movable member comprise a plunger or button having an area that is either reflective or absorptive of light in a waveband to which an interactive display system is responsive. By moving the area of the plunger from the first position to the second position, the area is moved sufficiently close to the interactive display surface, so that a change in an intensity of light that is either reflected by or absorbed by the area is detected by the interactive display system.

In another embodiment, the user input device includes a mirror coupled to the user-movable member and pivotally mounted adjacent to an orifice in the housing. In this embodiment, movement of the user-movable member from the first position to the second position pivots the mirror from a first angle to a second angle. At the first angle, the mirror reflects light received from the interactive display system and which has passed through the orifice, so that the reflected light is directed away from a sensor of the interactive display system. When the mirror is at the second angle, it reflects the light toward a sensor of the interactive display system.

In yet another embodiment, the user input device includes a power source that is coupled to an electronic display. The electronic display is controlled by the user-movable member and is energized in response to movement of the user-movable member from the first position to the second position. When thus energized, the electronic display provides a pattern that is detectable by the interactive display system.

Still another embodiment includes a power source that is coupled to a light source and controlled by the user-movable member. The light source is energized in response to movement of the user-movable member from the first position to the second position. When thus energized, the light source emits light that is then detectable by the interactive display system. The user-movable member can also move the light source to a position in which it is detectable by the interactive display system.

In one or more embodiments, the user-movable member comprises a plunger that moves through a plane of change when moved from the first position to the second position. The plane of change is disposed at a distance from the interactive display surface where the change of the parameter between states is detectable by the interactive display system. Generally the parameter comprises at least one of a light reflectance, a light absorbance, a light intensity, and a pattern.

Another aspect of the present invention is directed to a method for responding to a user input on an interactive display system. The steps of this method are generally consistent with the functionality of the user input device discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
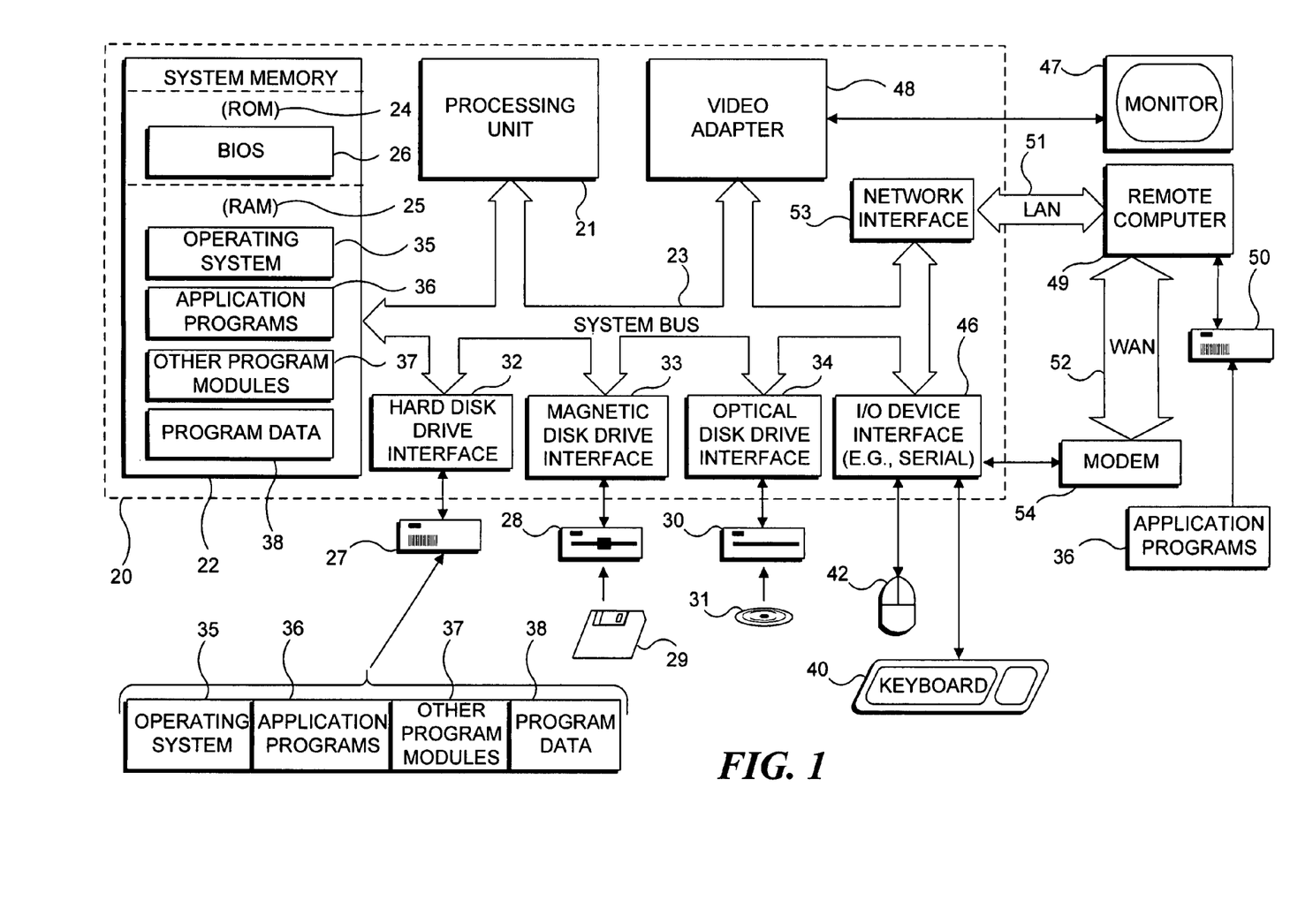
FIG. 1 is a functional block diagram of a generally conventional computing device or personal computer (PC) that is suitable for image processing for the interactive table as used in practicing the present invention.

FIG. 1 is a functional block diagram of an exemplary system suitable for use in connection with the present invention. The system includes a general purpose computing device in the form of a conventional PC 20, provided with a processing unit 21, a system memory 22, and a system bus 23. The system bus couples various system components including the system memory 22 to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. The hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk 27, magnetic disk drive 29, optical disk 31, ROM 24, or RAM 25, including an operating system 35, one or more application programs 36, other program modules 37, and program data 38. A user may enter commands and information into PC 20 and provide control input through input devices such as a keyboard 40 and a pointing device 42, as well as with the present invention. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. As discussed below, the interactive display table represents yet another input/output device that is coupled to the PC and which is useful for providing user input with the present invention. These and other input/output (I/O) devices are often connected to processing unit 21 through an I/O interface 46 that is coupled to the system bus 23. The term "I/O interface" is intended to encompass each interface specifically used for any of a serial port, a parallel port, a game port, a keyboard port, and/or a universal serial bus (USB). A monitor 47 or other type of display device is also connected to system bus 23 via an appropriate interface, such as a video adapter 48, although use of the interactive display table with PC 20 will make monitor 47 generally unnecessary, since the interactive display surface of the table serves the function of a monitor and more. In addition to the monitor, PCs are often coupled to other peripheral output devices (not shown), such as speakers (through a sound card or other audio interface—not shown) and printers.

The present invention may be practiced in connection with a single, standalone system; however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to the LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. A modem 54, which may be internal or external, is connected to the system bus 23 or coupled to the bus via I/O device interface 46 such as a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Surface

Figure 2:
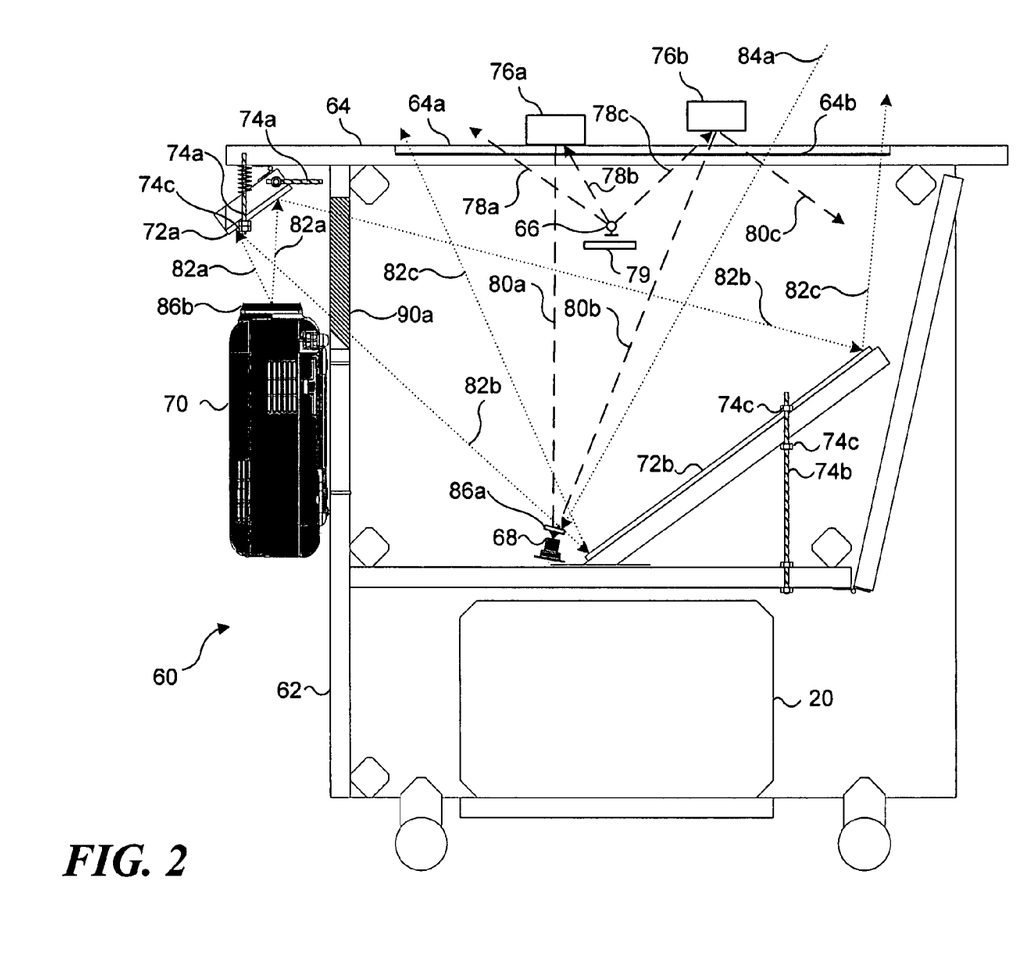
FIG. 2 is a cross-sectional view of the interactive table comprising an interactive display system, illustrating internal components.

In FIG. 2, an exemplary interactive display table 60 is shown that includes PC 20 within a frame 62 and which serves as both an optical input and video display device for the computer. In this cut-away figure of the interactive display table 60, rays of light 82a-82c used for displaying text and graphic images are generally illustrated using dotted lines, while rays of infrared (IR) light used for sensing objects on or just above a interactive display surface 64a of the interactive display table 60 are illustrated using dash lines. The interactive display surface 64a is set within an upper surface 64 of interactive display table 60. The perimeter of the table surface is useful for supporting a user's arms or other objects, including objects such as a user input device in accord with the present invention that may be used to interact with the graphic images or virtual environment being displayed on interactive display surface 64a.

IR light sources 66 preferably comprise a plurality of IR light emitting diodes (LEDs) and are mounted on the interior side of frame 62. The IR light that is produced by IR light sources 66 is directed upwardly toward the underside of interactive display surface 64a, as indicated by dash lines 78a, 78b, and 78c and is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to prove an even illumination of interactive display surface 64a The infrared light produced by the IR sources may:

exit through the table surface without illuminating any objects, as indicated by dash line 78a;

illuminate objects on the table surface, as indicated by dash line 78b; or     illuminate objects a short distance above the table surface but not touching the table surface, as indicated by dash line 78c.

Objects above interactive display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of interactive display surface 64a, the amount of IR light that is reflected by the object increases to a maximum level that is achieved when the object is actually in contact with the display surface.

A digital video camera 68 is mounted to frame 62 below interactive display surface 64a in a position appropriate to receive IR light that is reflected from any touch object or hover object disposed above interactive display surface 64a. The digital video camera 68 is equipped with an IR pass filter 86a that transmits only IR light and blocks ambient visible light traveling through interactive display surface 64a along dotted line 84a A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with interactive display surface 64a and corresponds to an image of IR light reflected from objects on or above the display surface. It will be apparent that digital video camera 68 will also respond to any IR light included in the ambient light that passes through interactive display surface 64a from above and into the interior of the interactive display including ambient IR light that also travels along the path indicated by dotted line 84a

IR light reflected from objects on or above the table surface may be:
- reflected back through translucent layer 64b, through IR pass filter 86a and into the lens of digital video camera 68, as indicated by dash lines 80a and 80b; or
- reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to interactive display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

Embodiments of the present invention thus are operable to recognize an object and/or its position relative to the interactive display surface 64a by detecting and identifying its identifying characteristic's response to reflected IR light. The logical steps implemented to carry out an exemplary form of identifying one or more such identifying characteristics are explained in the commonly-assigned patent applications— application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference.

Although a current preferred embodiment of the interactive display table uses IR light to detect objects placed adjacent to interactive display surface 64a, it is contemplated that other types of signals might be used for this function in the future. For example, parameters such as the capacitance of an object, a radio frequency signal, or an electromagnetic parameter can be sensed by a suitable interactive display surface using techniques that are currently known, or which may also be developed in the future. Accordingly, the present invention is not intended to be limited solely for use with an interactive display surface that uses light as a parameter that enables a state of a user input device disposed adjacent to the interactive display surface to be detected. The state one of various other parameters can be changed to provide an input to an interactive display table or system that is provided with appropriate means for detecting the change in state of that specific parameter.

Figure 3:
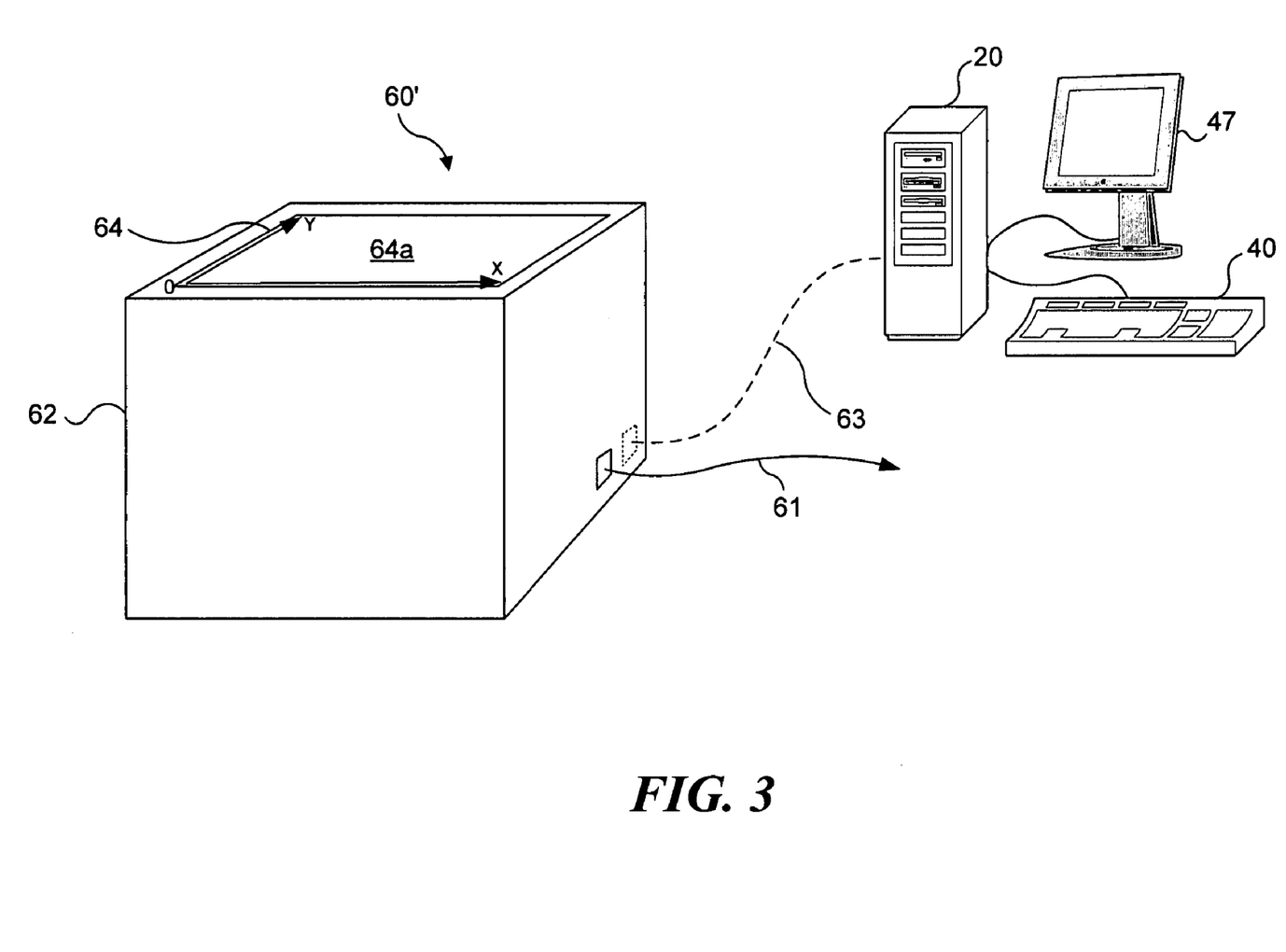
FIG. 3 is an isometric view of the interactive table.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with interactive display surface 64a, as well as an origin indicated by "0." While not discretely shown, it will be appreciated that a plurality of coordinate locations along each orthogonal axis can be employed to specify any location on interactive display surface 64a.

If interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on interactive display surface 64a and identify objects that are resting atop the display surface, such as an object 76a, or are hovering just above it, such as an object 76b in FIG. 2.

Again referring to FIG. 2, interactive display table 60 includes a video projector 70 that is used to display graphic images, a virtual environment, or text information on interactive display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above interactive display surface 64a Video projector 70 projects light along dotted path 82a toward a first mirror assembly 72a First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on interactive display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent to the display surface.

Exemplary Embodiments of User Input Device with One or More User Controls

Figure 4A:
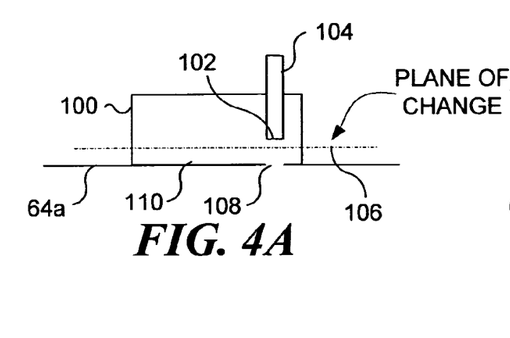
FIGS. 4A and 4B are schematic cross-sectional views of a user input device respectively showing a user control before actuation, and after actuation, so that movement of the user control through a "plane of change" is detectable by an interactive display system with which the user input device is used.
Figure 4B:
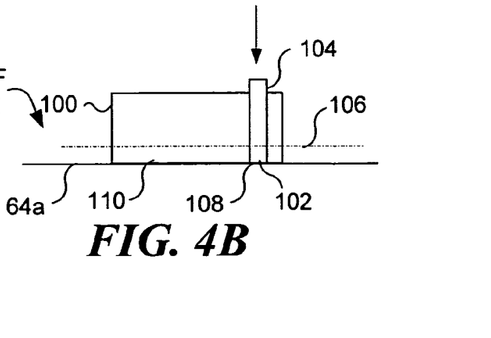

FIGS. 4A and 4B schematically illustrate how a user input device 100 is employed in connection with interactive display surface 64a (with its underlying translucent layer 64b, which diffuses both visible and IR light) to detect a change in state of a parameter when an area 102 on one end of a user control 104 is moved by a user so that area 102 passes through a "plane of change" 106. Perhaps in regards to the embodiments of FIGS. 4A, 4B, 5A, 5B, 6A, 6B, 8, and 9, plane of change 106 is better referred to as a "plane of detection" corresponding to an image formation depth limit, since the plane of detection is spaced from interactive display surface 64a at the limit of image formation that is provided by translucent layer 64b in regard to the detection of an IR image of an object disposed adjacent to interactive display surface 64a In other words, IR light reflected from an object that is above plane of change (or plane of detection) 106 is too diffuse and will not be detected as an image of an object, but once the object is moved closer to the interactive display surface (i.e., past or through the plane of change), the IR light reflected from that object can be detected as an image. It is because the other embodiments of FIGS. 7A, 7B, and 10 require a more general term that is less directly related to the IR imaging limit, that the term "plane of change" is used herein as more applicable to all of the embodiments.

Immediately below area 102 on user control 104 is an orifice 108 that is formed within a bottom 110 of user input device 100. Orifice 108 is sized to be generally equal in shape and extent to area 102. The undersurface of user input device 100 includes an identifying pattern (not shown here, but as discussed below in connection with FIGS. 5A and 5B). This pattern is changed when a user applies a force depressing user control 104, causing area 102 to pass through plane of change 106. Area 102 is then disposed adjacent to interactive display surface 64a where it can be sensed in response to the IR light that it reflects through orifice 108. This reflected light then becomes a part of the pattern associated with user input device 100 that is detected by the interactive display system.

Figure 5A:
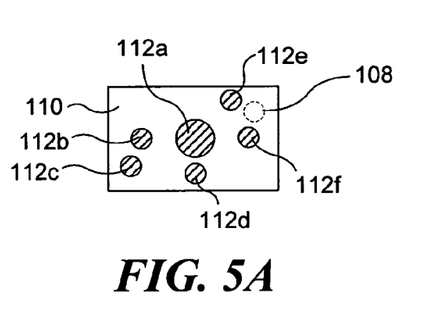
FIGS. 5A and 5B are schematic illustrations showing patterns that are recognizable by the interactive display system on an undersurface of the user input device respectively before and after actuation of the user control in FIGS. 5A and 5B.

Bottom 110 can be generally transparent so that it does not reflect IR light except where an IR reflective material has been applied to produce circular areas 112a-112f as shown in FIG. 5A. Circular area 112a is somewhat larger in diameter than the other circular areas comprising the pattern, because it serves as an index indicating a center of an object where the pattern is disposed.

Figure 5B:
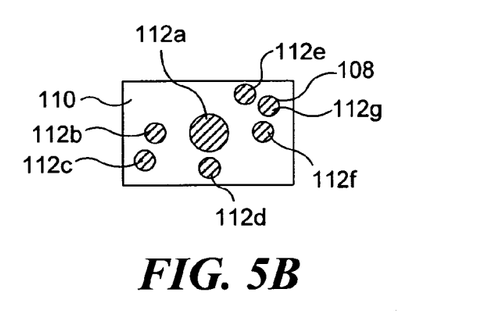

Area 102 also preferably comprises IR reflective material. However, light from an IR light source below interactive display surface 64a that is reflected from area 102 when it is disposed above plane of change 106 is too diffused to be detected by the interactive display system. However, as shown in FIG. 5B, movement of area 102 so that is disposed below plane of change 106 enables IR light that passes through orifice 108 and is reflected by area 102 to be readily detected by the interactive display system. Light reflected from area 102 then corresponds to a new circular area 112g, thereby changing the pattern associated with user input device 100. The change in the pattern on bottom 110 of user input device 100 from that shown in FIG. 5A to that shown in FIG. 5B is thus readily detected by the interactive display system as a user input provided with input device 100. The disposition of user input device 100 on the interactive display surface can have significance apart from the present invention. Input of data with user input device as discussed above can also cause different results or a different response, depending upon the location of the user input device on the interactive display surface and the state of the application with which it enables the user to interact.

It should be understood that bottom 110 of user input device 100 could be made to be IR reflective, except for circular areas 112a-112f, which would then comprise an IR absorptive material. However, area 102 would still comprise an IR reflective material. The patterns shown in FIGS. 5A and 5B would then be reversed in regard to the effect of depressing user control 104, since IR light entering orifice 108 when area 102 is above plane of change 106 would be absorbed within the interior of user input device 100 and not detected, but would be reflected from area 102 and detected by the interactive display system when user control 104 is depressed by a user, as shown in FIG. 4B.

Area 102 could alternatively comprise an IR light source, such as an IR light emitting diode, that is activated (and/or) moved through the plane of change by a user depressing user control 104. The IR light emitted by the light emitting diode can readily be detected as an IR bright spot within orifice 108 to provide an input to the interactive display system. A power supply (such as shown in an embodiment illustrated in FIG. 10) would then be included in user input device 100 to provide power to energize the IR light emitting diode when user control 104 is depressed (again, as shown and discussed below in connection with FIG. 10).

Figure 6A:
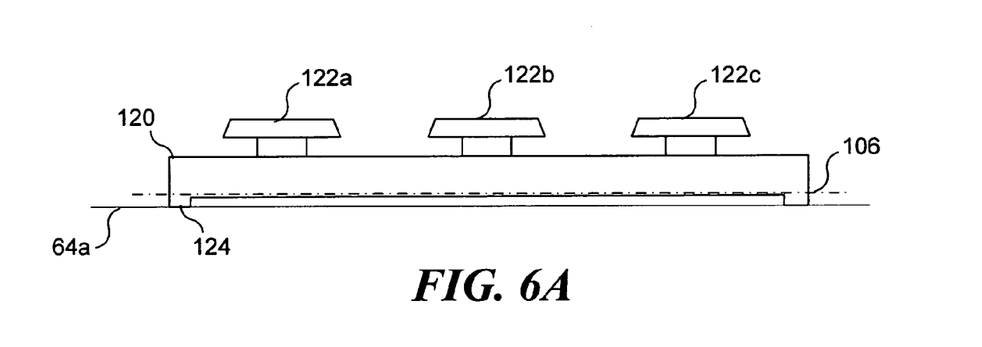
FIGS. 6A and 6B are side elevational views of a keypad embodiment of the present invention respectively showing the keys before and after a key is selectively moved through the plane of change to provide an input to an interactive display system.
Figure 6B:
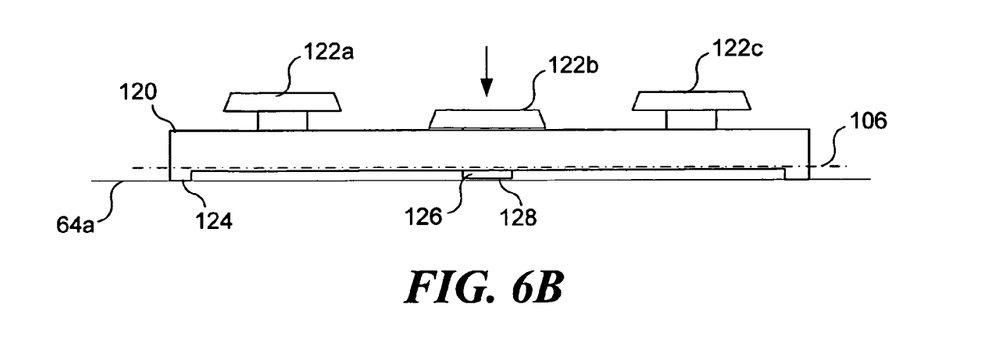
Figure 6C:
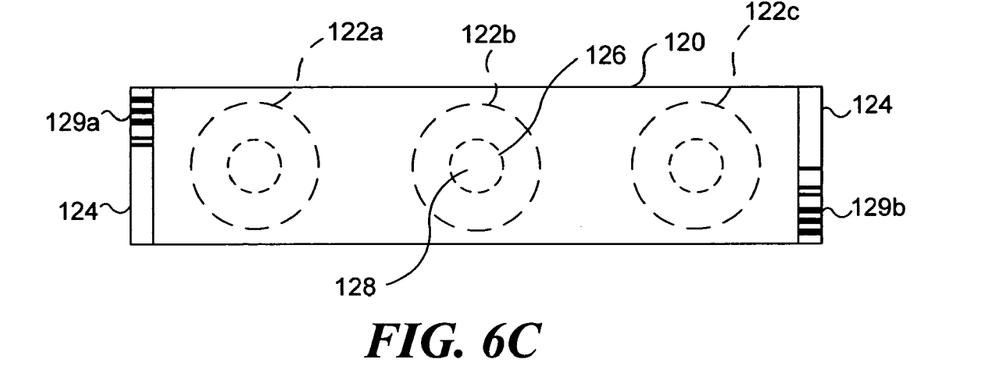
FIGS. 6C and 6D are bottom views of the keypad embodiment of FIGS. 6A and 6B, showing the IR imaging when the center key is respectively not depressed (as in FIG. 6A), and depressed through the plane of change (as in FIG. 6B)
Figure 6D:
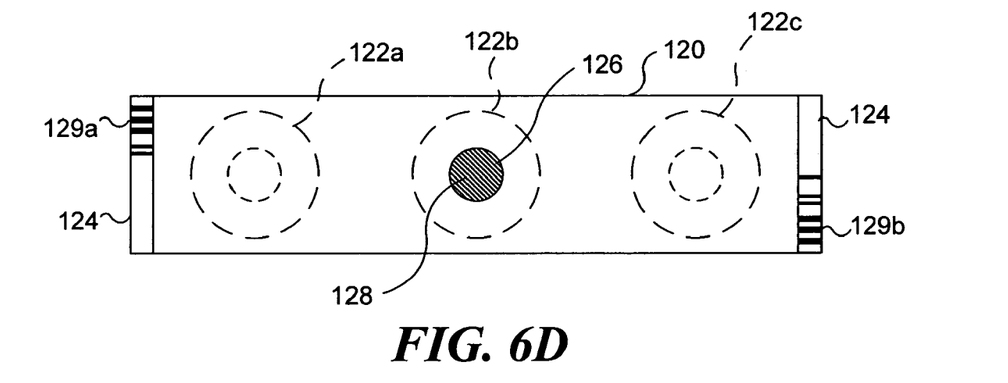

FIGS. 6A-6D schematically illustrate a second embodiment of a user input device 120 having a plurality of keys 122a-122c that can be selectively depressed by a user to provide different inputs to the interactive display system. As shown in FIGS. 6C and 6D, user input device 120 can readily be identified by the interactive display system, by reading barcodes 129a and 129b (or other pattern) appearing on a peripheral area 124 at the ends of the user input device. FIG. 6A illustrates user input device 120 prior to a user depressing any of keys 122a-122c. FIG. 6C shows the bottom of input device 120 corresponding to this state of keys 122a-122c. By way of example, FIG. 6B illustrates how depression of key 122*b* by the user causes an IR reflective area 128 disposed on the bottom surface of a stem 126 to move an IR reflective area 128 on the lower end of the stem through plane of change 106 so that the IR reflective area is detected by the interactive display system. FIG. 6D shows the bottom of this user input device after key 122*b* is depressed and illustrates how the change in state when key 122*b* is depressed is readily detected by imaging the IR light reflected from IR reflective area 128.

The specific key that was depressed by a user can be determined based upon a pattern provided by IR reflective area 128, or alternatively, can be determined based upon the relative disposition of IR reflective area within peripheral area 124. User input device 120 can be transparent to IR light, except around peripheral area 124, which can readily be indexed to indicate a particular orientation of user input device 120 to ensure that any key that is depressed by a user is properly identified. As a further alternative, the bottom surface of user input device 120 can be IR reflective except around peripheral area 124, and the bottom of stem 126 can be coated with an IR absorptive material, which can also be configured in an identifying pattern, or instead only cover the bottom of stem 126. In this way, the interactive display system can again readily recognize which one or more keys 122*a*-122*c* has been depressed by user. Although only three keys are shown in FIGS. 6A and 6B, either more or fewer keys can be included and each key distinctively recognized by the interactive display system when depressed by a user. Thus, user input device 120 could readily be configured as either a decimal or hexadecimal keypad.

Further Examples of User Input Devices

Figure 7A:
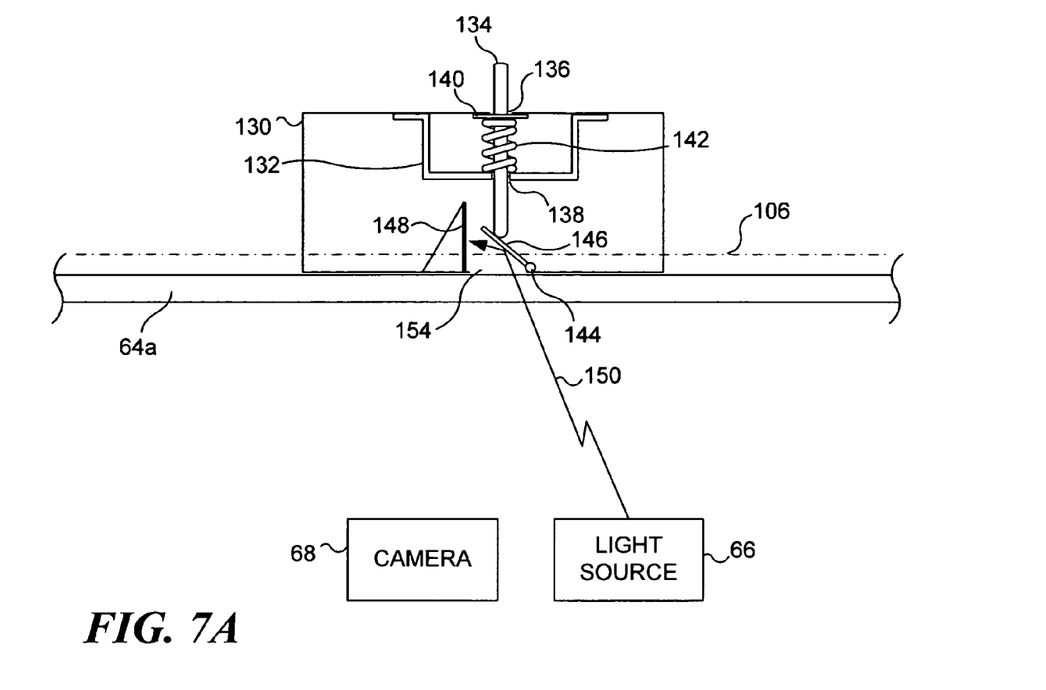
FIGS. 7A and 7B are a schematic cross-sectional view of a user input device respectively showing a mirror before and after being moved through the zone of change in response to a user control being depressed, so that light reflected by the mirror is either absorbed inside the user input device or reflected back to a camera in the interactive display system.
Figure 7B:
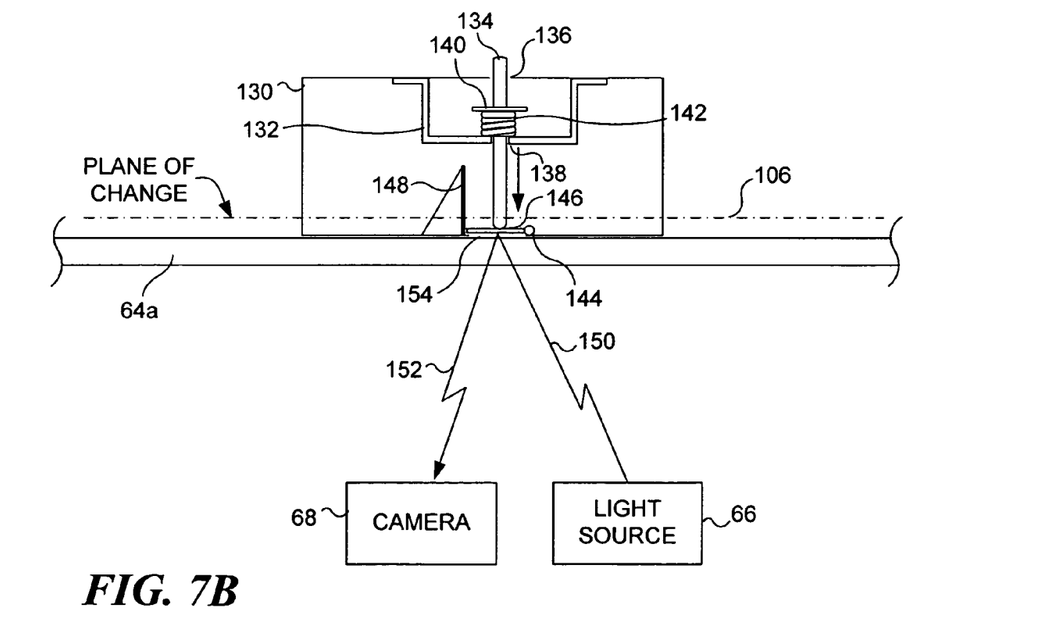

FIGS. 7A and 7B illustrate details of a further embodiment for a user input device 130. Although not shown, it will be understood that the undersurface of user input device 130 can include an IR barcode or other pattern readily recognized by the interactive display system so that disposition of user input device 130 on interactive display surface 64*a* will be detected and the user input device will be identified. Merely placing user input device 130 on interactive display surface 64*a* can provide an initial input, and the input can include the effect of moving the user input device about on the interactive display surface. But in connection with the present invention, a further input can be provided by a user interacting with this input device.

Mounted inside user input device 130 is a bracket 132 that provides support for a user control 134. User control 134 passes through an orifice 136 within the top of user input device 130 and through an orifice 138 formed within bracket 132. A plate 140 is connected to user control 134 and provides a surface against which a helical spring 142 applies a biasing force relative to bracket 132. This biasing force acts so that user control 134 is normally maintained in extended position, with plate 140 disposed under and adjacent to orifice 136. When user control 134 is depressed by a user, plate 140 compresses helical spring 142 against bracket 132. Also included within user input device 130 is a torsion spring pivot joint 144, which applies a rotational force that biases the back of a mirror 146 against the lower end of user control 134. Torsion spring pivot joint 144 is disposed adjacent an orifice 154, which is formed in the bottom of user input device 130, and mirror 146 is disposed immediately above orifice 154. Before user control 134 is depressed by a user, mirror 146 forms an angle approximately 45° to the horizontal, so that IR light 150 from light source 66 passing through orifice 154 is reflected from mirror 146 and into an IR absorptive surface 148 mounted vertically within the interior of user input device 130.

As shown in FIG. 7B, when a user depresses user control 134 in opposition to the biasing force produced by helical spring 142, mirror 146 is rotated through plane of change 106 to a position in which the mirror is substantially horizontal and overlies orifice 154. IR light 150 from light source 66 is then reflected from mirror 146 and reflected IR light 152 is received and detected by camera 68. Depression of user control 134 thereby produces an input to the interactive display system indicating a change of state for a bit of data.

Figure 8:
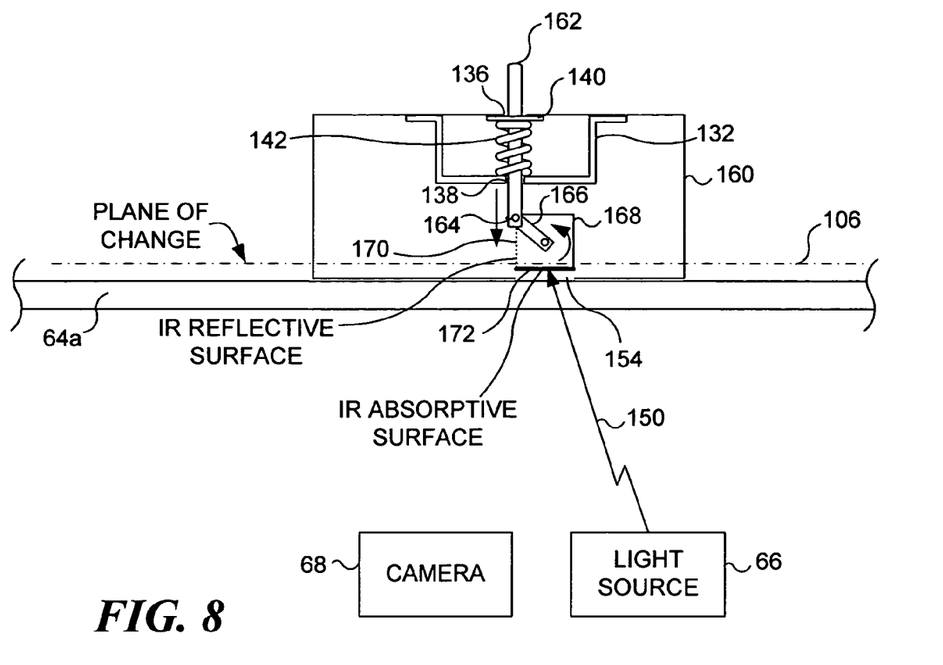
FIG. 8 is a schematic cross-sectional view of another embodiment of a user input device in which the user control rotates a cube between two different positions to move faces of the cube having different light reflective/absorptive properties through the plane of change.

An embodiment of a user input device 160 that is similar to, but slightly different than user input device 130, is illustrated in FIG. 8. Again, as is the case with the other user input devices discussed herein, an appropriate barcode or other pattern or recognized by the interactive display system will preferably be provided on the undersurface of user input device 160. In response to that distinctive identifying barcode or pattern, the interactive display system can detect the location and potentially, the disposition, of user input device 160 on interactive display surface 64*a*. User input device 160 includes a rotatable cube 168 having an IR reflective surface 170 on a vertical face, and an IR absorptive surface 172 on a horizontal face. This rotatable cube is disposed above orifice 154. With the IR absorptive surface over and adjacent to the orifice, IR light is not reflected back to the camera.

The lower end of a user control 162 is mounted through a pivot connection 164 to a link 166. Link 166 is coupled to rotatable cube 168. Although not shown, it will be apparent that if the user depresses user control 162, helical spring 142 is again compressed against bracket 132, and rotatable cube 168 is rotated by link 166 to bring IR reflective surface 170 into a horizontal position over orifice 154. IR reflective surface 170 will then reflect IR light 150 from light source 66 toward camera 68 to provide an input corresponding to a bit of data to which the interactive display system can respond. If the bottom surface of input device 130 is made to be IR absorptive to about the same extent as IR absorptive surface 172, IR absorptive surface 172 when exposed through orifice 154 will appear as simply to be part of the bottom surface of the input device. But, when user control 162 is depressed, IR reflective surface 170 will be rotated into position above and adjacent to orifice 154, so that a bright IR reflection shaped like the orifice will be visible to the IR camera. Alternatively, the bottom of user input device 130 can be made IR reflective to about the same extent as IR reflective surface 170. In this alternative embodiment, IR absorptive surface 172 would then be readily imaged through the shape of orifice 154 when the user control is not depressed and would appear as a dark region within the reflective bright background comprising the bottom of the user input device. The change caused by the user depressing user control 162 would still be readily detected by the IR camera, since the reflection from the IR reflective surface would then appear uniformly the same as the bottom of the user input device.

Figure 9:
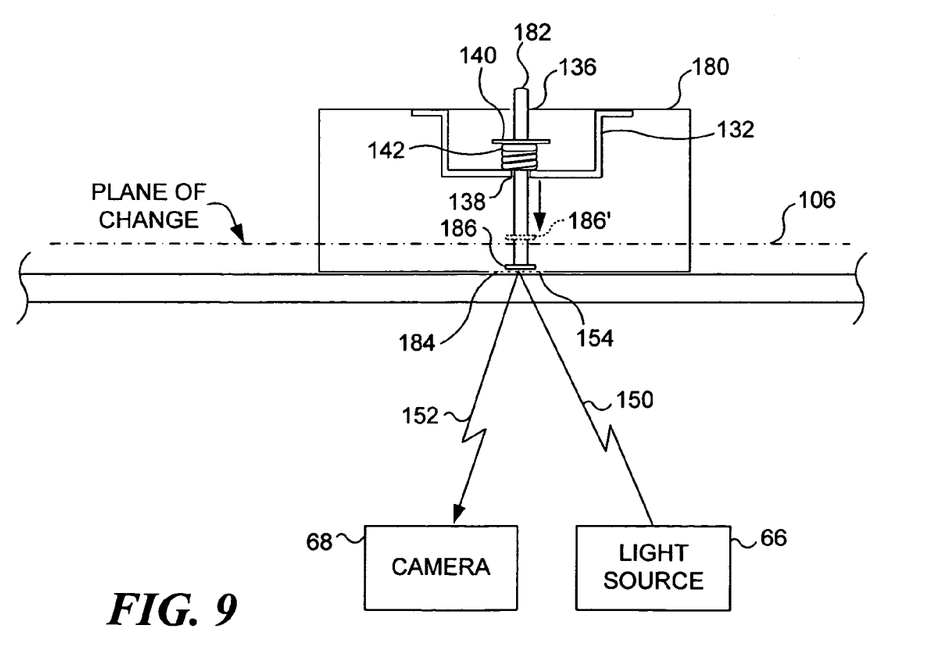
FIG. 9 is a schematic cross-sectional view of yet another embodiment of a user input device in which a user control moves a surface through the plane of change to alter light reflected through an interactive display surface to a camera.

FIG. 9 illustrates details of a user input device 180 that is generally similar to user input device 100 illustrated in FIGS. 4A and 4B. User input device 180 includes a user control 182, which is shown after being depressed. Depression of the user control has moved a reflective surface 186 disposed on the lower end of user control 182 from a phantom position indicated by a reference number 186' above plane of change 106, to its current position immediately at or above orifice 154. In this embodiment, orifice 154 is covered by a diffusing material 184, e.g., vellum or some similar appropriate diffusing material to improve the ability of camera 68 to detect the reflected light. Accordingly, IR light from light source 66 passes through diffusing material 184 and is reflected from reflective surface 186, toward camera 68. The interactive display system is thus able to detect and respond to the action of the user depressing user control 182.

Figure 10:
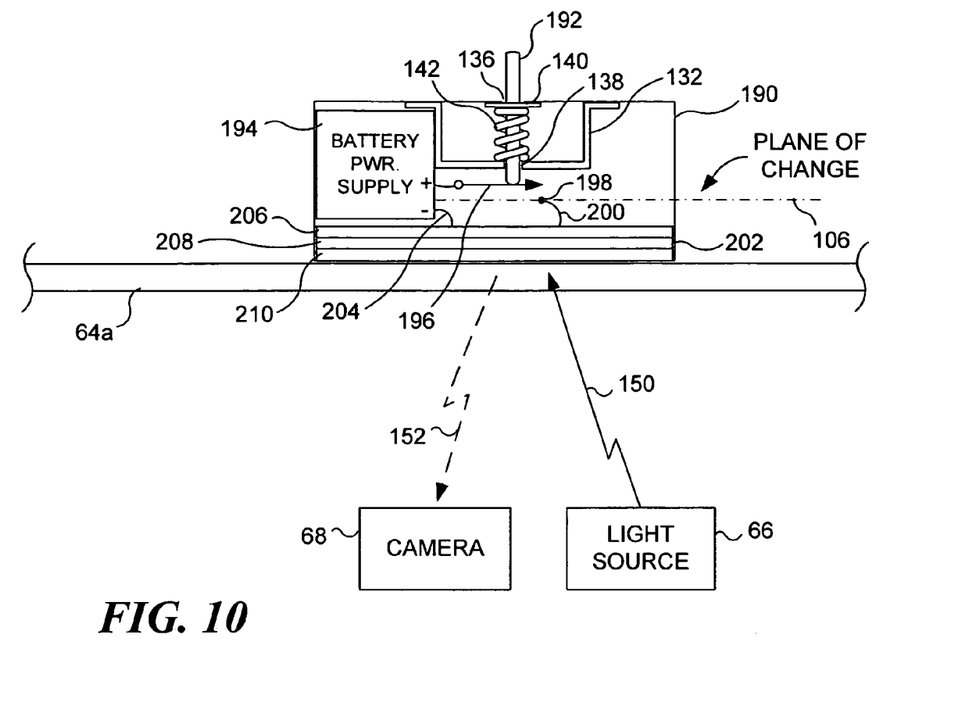
FIG. 10 is a schematic cross-sectional view of an embodiment of a user input device in which a user control actuates a switch to energize an electronic display to produce/alter a pattern detectable by a camera of an interactive display system.

Each of the embodiments of the user input devices discussed above have generally been passive in nature. In contrast, FIG. 10 illustrates an embodiment of a user device 190 that includes an electronic display 202 directed downwardly toward interactive display surface 64*a*. Electronic display 202 is shown substantially thicker than actually required in practice and includes two (and optionally—three) layers. A top layer 206 comprises the backplane of the electronic display and employs an appropriate material to absorb light having a wavelength that is below a predefined value, while reflecting light having a wavelength greater than the predefined value. In this example, the backplane comprising top layer 206 preferably absorbs light having a wavelength less than about 750 nm, while reflecting light having a wavelength greater than this predefined value. Light source 66 produces IR light having a wavelength of approximately 800 nm and is thus reflected from top layer 206. An intermediate layer 208 is optional and comprises an IR light plane that can provide IR backlighting for the LCD comprising bottom layer 210. Use of the optional intermediate layer improves the ability of camera 68 to detect a pattern image appearing on the electronic display.

A user control 192 extends through orifices 136 and 138, and its lower end actuates a switch 196 by moving through plane of change 106. Switch 196 is connected to a positive terminal of a battery power supply 194 and when activated by user depressing user control 192, closes with a contact 198 that is connected through a lead 202 to electronic display 202. A negative terminal of the battery power supply is connected through lead 204 directly to the electronic display. Accordingly, by depressing user control 192, the user can cause a predefined pattern to be displayed on electronic display 202 adjacent to interactive display surface 64*a*, and this pattern is detected by camera 68.

Figure 11A:
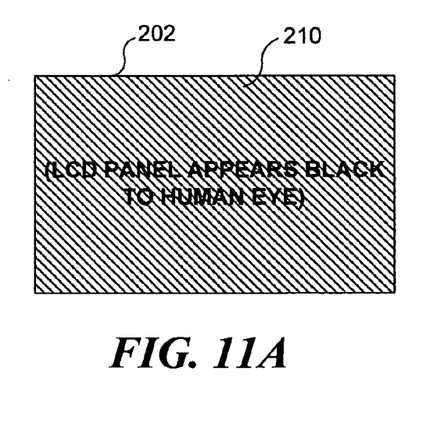
FIGS. 11A and 11B illustrate the electronic display employed in the user input device of FIG. 10 respectively as it appears to the human eye when off or energized, and as it appears to an infrared (IR) camera when energized.
Figure 11B:
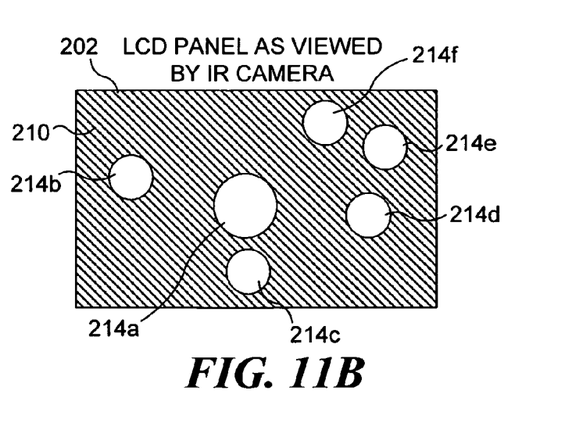

In FIG. 11A, bottom layer 210 of electronic display 202 is shown and appears "black" to the human eye, regardless of the state of switch 196. In contrast, the appearance of the LCD panel comprising bottom layer 210 is illustrated in FIG. 11B as it appears to camera 68. The camera perceives IR light 152 received from the LCD panel and responds to the pattern provided by the LCD panel. An exemplary pattern comprising a plurality of circles 214*a*-214*f* is thus perceived by the camera when user control 192 is depressed to activate switch 196.

Alternatively, it will be appreciated that the user control can both activate switch 196 and selectively move an electronic display (e.g., smaller in area than electronic display 202) that is coupled to user control 192 so that the display is energized after passing through plane of change 106 and is thus positioned where the IR light produced/or reflected from it can be detected by the camera. The display would be thus both energized and brought into a position where it is detectable by camera 68 when the user depresses user control 192. The electronic display on this embodiment could alternatively be replaced with a simple IR light source (e.g., an IR light emitting diode) that produces IR light detectable by the interactive display system when activated and disposed (and/or optionally moved by a user) below the plane of change and proximate to interactive display surface 64*a*, in response to the user depressing user control 192.

If only a portion of the bottom of user input device 190 include the electronic display that is selectively activated by user control 192, the electronic display can be selectively actuated by user control 192 to modify a pattern of IR reflective or absorptive elements included on the bottom of user input device 190. Activation of the electronic display can thus modify an otherwise static pattern provided on the bottom of the user input device, so that the modified pattern is detectable in response to IR light received by the camera from the bottom of the user input device. These and other variations that employ an active electronic display or light source on a user input device will be apparent to those of ordinary skill in the art, in view of the preceding remarks.

Figure 12:
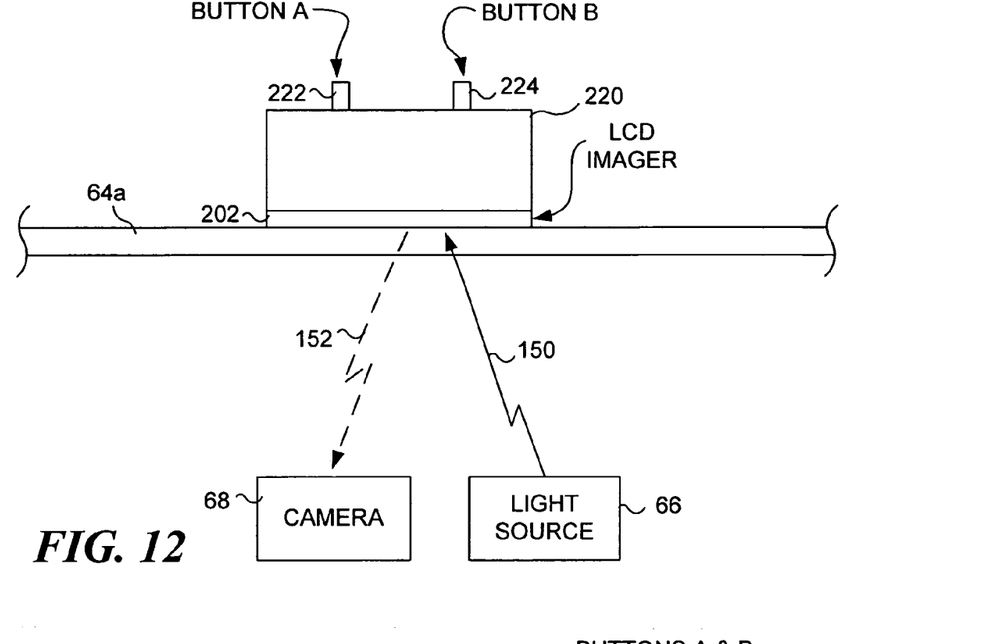
FIG. 12 is a side elevational view of a user input device having two control buttons that can be selectively independently depressed by a user to produce four different pattern states on an electronic display sensed by a camera of an interactive display system.

For example, FIG. 12 illustrates a related embodiment of a user input device 220 that includes user controls 222 and 224 corresponding respectively, to buttons A and B. User input device 220 also includes electronic display 202 on its lower surface, so that camera 68 can respond to an image of a pattern produced by the electronic display. It will be apparent that a user can selectively depress either or both of buttons A and B, to define one of four different states for the pattern produced by electronic display 202.

Figure 13A:
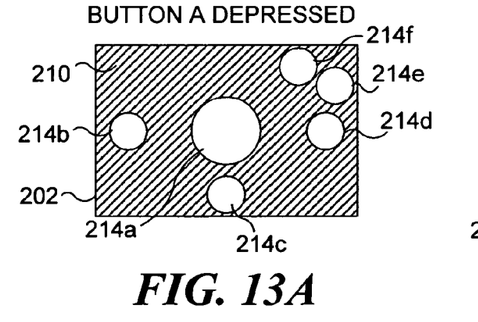
FIGS. 13A-13D respectively illustrate the four different pattern states selectively produced by the embodiment of FIG. 12.
Figure 13B:
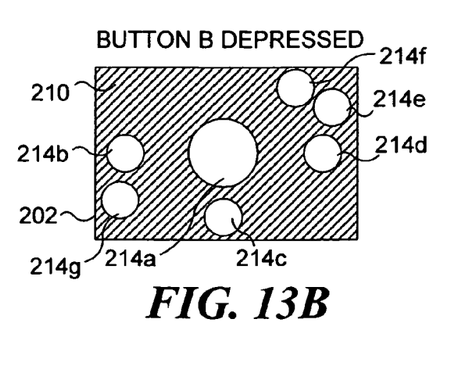
Figure 13C:
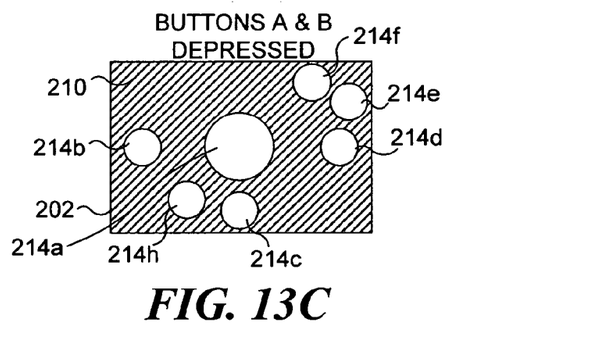
Figure 13D:
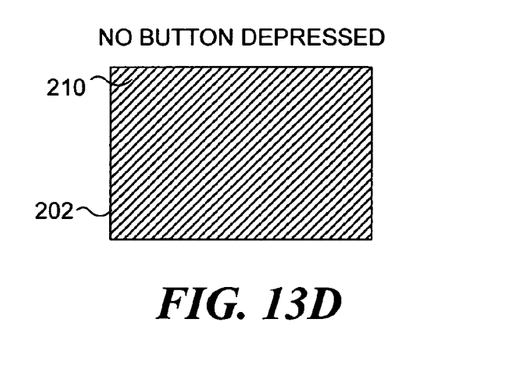

FIGS. 13A-13D illustrate the four different pattern states detectable by camera 68, as a function of the buttons on user input device 220 that are depressed by a user. In FIG. 13A, only button A is depressed, which causes IR circles 214*a*-214*f* to be active and detectable by camera 68. Only button B is depressed in FIG. 13B, causing circles 214*a*-214*f* and circle 214*g* to be active and detectable by the camera. In FIG. 13C, circles 214*a*-214*f*, and circle 214*h* are activated by the user depressing both buttons on user input device 220. However, if neither button A nor button B is depressed, no pattern is displayed on the bottom of electronic display 202, as shown in FIG. 13D. Although only two user control buttons are shown in the example of FIG. 12, it will be appreciated that additional such user controls can be included to enable the user to selectively "chord" even a greater number of different distinctive pattern states as inputs to the interactive display system. As used herein, the verb "chord" is intended to refer to the simultaneous activation of a plurality of user controls to provide a plurality of simultaneous user inputs, just as a chord played on a musical instrument corresponds to a plurality of tones being played at the same time, e.g., C, E, and G. Similarly, in the present invention, different combinations of the user controls can be activated as different chords to selectively provide different inputs to the interactive display system.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An input device adapted to be used in connection with an interactive display system that has an interactive display surface, the input device comprising:
   (a) a housing that is adapted to be placed in proximity to the interactive display surface;
   (b) a power supply disposed within the housing;
   (c) an electronic display coupled to the power supply, the electronic display being in one of an energized state or a non-energized state, and wherein when the electronic display is in the energized state, the electronic display displays a pattern that is then detectable by the interactive display system and is an input to the interactive display system;

(d) a user control disposed within the housing, the user control being movable from a first position to a second position, movement of the user control from the first position to the second position causing the electronic display to enter the energized state wherein, while the electronic display remains in the energized state and the input device is in sufficient proximity to the interactive display system to be detectable by the same, an input is provided to the interactive display system.

2. The input device of claim 1, wherein the user control comprises a plunger that moves through a plane of change when moved from the first position to the second position such that when in the second position the plunger activates a switch that connects the electronic display to the power supply.

3. The input device of claim 1, wherein the electronic display comprises at least two layers, the at least two layers comprising:

a backplane top layer that is absorptive of certain wavelengths of light and reflective of other wavelengths of light, and an LCD bottom layer that comprises an LCD display which displays the pattern that is then detectable by the interactive display system and is an input to the interactive display system.

4. The input device of claim 3, the electronic display further comprising an intermediate layer that provides IR backlighting for the LCD bottom layer.

5. The input device of claim 1, wherein the electronic display is coupled to and controlled by the user control such that, in addition to entering the energized state in response to the movement of the user control from the first position to the second position, the electronic display also passes from a first position through a plane of change to a second position, the plane of change corresponding to a point where the pattern being displayed by the electronic display is detected by the interactive display system.

6. The input device of claim 1, wherein the electronic display, while in the energized state, alters a static pattern of IR reflective or absorptive elements included on the bottom of the user input device.

7. The input device of claim 1, further comprising one or more additional user controls such that the input device comprises a plurality of user controls disposed within the housing, each of the plurality of user controls being simultaneously movable between a first position and a second position, and wherein the electronic display enters the energized state in response to the movement of one or more of the plurality of user controls from the first position to the second position, and wherein the pattern displayed by the electronic display when in the energized state is one of a plurality of patterns which correspond to different states of the positions of the plurality of user controls such that a different input is provided to the interactive display for each of the plurality of patterns.

8. The input device of claim 1, wherein the power supply is a battery power supply.

* * * * *